Aug. 19, 1969   E. J. GRIMMER   3,462,545
CONDENSER BUSHING
Filed Jan. 13, 1967
FIG. 2.
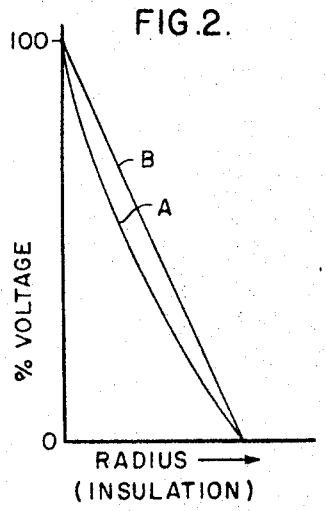
FIG. 1.
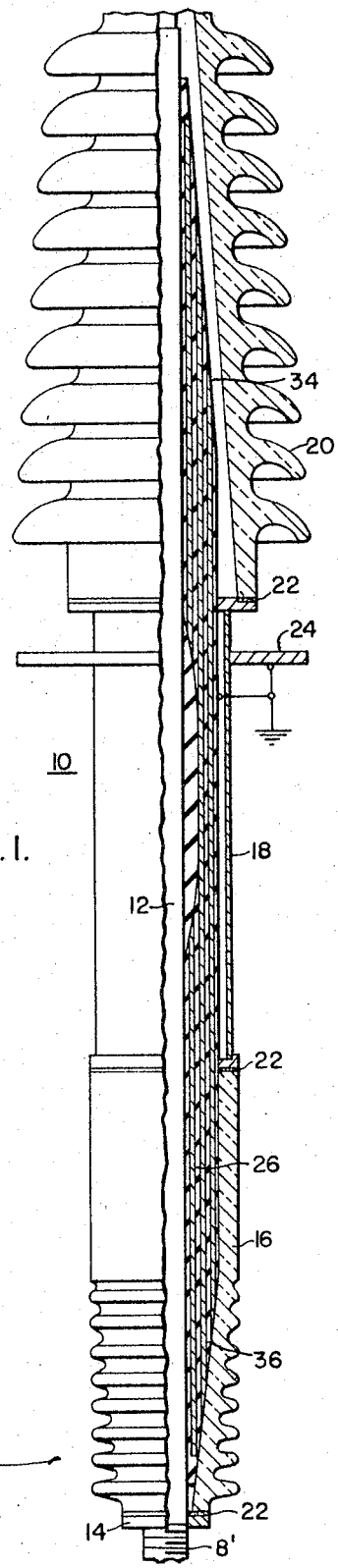
FIG. 3.
FIG. 4.
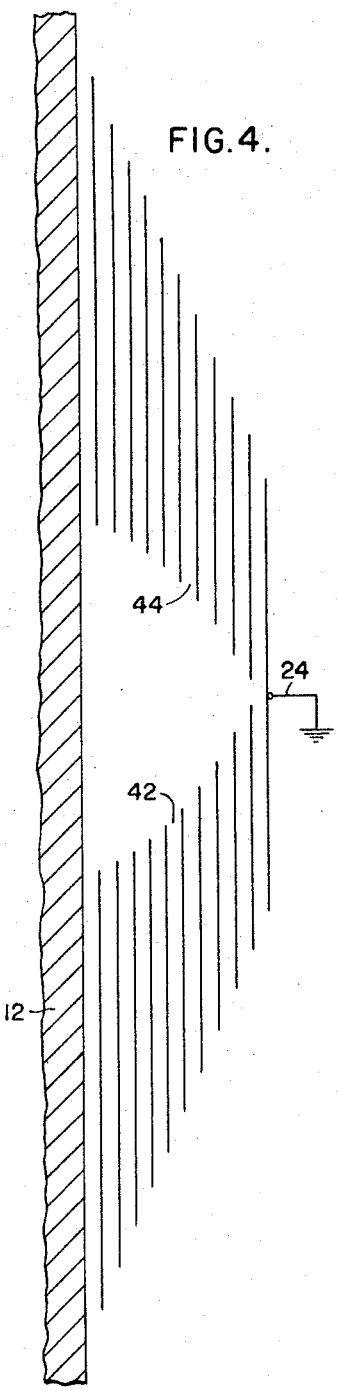
WITNESSES
Edwin L. Barber
James F. Young
INVENTOR
Elmer J. Grimmer
BY Maury J. Hill
ATTORNEY

United States Patent Office 3,462,545
Patented Aug. 19, 1969

3,462,545
CONDENSER BUSHING
Elmer J. Grimmer, Sharpsville, Pa., assignor to Westinghouse Electric Corporation, Pittsburgh, Pa., a corporation of Pennsylvania
Filed Jan. 13, 1967, Ser. No. 609,185
Int. Cl. H01b 17/28
U.S. Cl. 174—143         5 Claims

ABSTRACT OF THE DISCLOSURE

A condenser bushing has a member concentric layers of dielectric material interposed between a conductor stud passing through the bushing and a mounting flange which is usually at ground potential, with layers of conductive material such as foil alternating with the layers of dielectric material. The thickness of all layers of dielectric material are equal. The layers of foil (except in some cases the outermost layer) are not continuous from end to end. They are individually adjusted in length by a graduated discontinuity approximately in the center of each layer of foil to provide that the capacity between any two adjacent layers of foil is substantially equal throughout the bushing, thereby providing that all layers of dielectric are equally stressed. The overall extensions of the foil layers are stepped in equal steps, insuring that the electrostatic fields at the ends of the foil layers are equal.

BACKGROUND OF THE INVENTION AND FIELD THEREOF

This invention relates to high voltage insulating bushings, and more particularly to an insulating bushing of the condenser type.

DESCRIPTION OF THE PRIOR ART

As is known, high voltage insulating bushings comprise a flange by which they may be attached to a conducting barrier, generally at ground potential, a conductor of electricity which carries the current at high voltage and extends centrally and longitudinally through the flange, and a shell of insulating material, sometimes paper, which surrounds the conductor and insulates it from the flange. In high voltage condenser bushings, equal capacity series capacitors are provided between the inner conductor and the outer flange by means of layers of concentric cylindrical metallic foil arranged in the insulating material, there being alternate layers of conductive material and insulating material. One prior art practice is that in dimensioning the conducting foils separated by layers of insulating material as the diameter of successive foil layers increases, their lengths are decreased to obtain equal capacitances. In this manner, the voltage is graded in equal steps between the conductor and the outer flange, resulting in important advantages in the stressing of the insulation in the bushing. Furthermore, in prior art condenser bushings the bushings were normally designed with metal foils extending effectively continuously from end-to-end and introduced at nonuniform increments in diameter, resulting in nonuniform thicknesses of insulation between successive foils. Specifically, the thickness of the insulation layers between the radially intermediate metal foils was greater than that of the innermost and outermost layers, with the result that this thicker insulation was not worked at maximum permissible dielectric stress. This not only increased the diameter of the completed bushing, but also resulted in inefficient use of insulation.

The presence of unequal thicknesses of insulation in a conventional condenser bushing can be appreciated when it is remembered that the areas of successive concentric cylinders may not be equal when the spacing between the ends of the successive foils along the axis of the bushing are equal. Thus, it is not simply a matter of increasing the diameter of successive foils in equal increments and adjusting the lengths of the cylindrical foils to obtain equal areas, since this would result in unequal steps at the ends of the foils. Such unequal steps would, of course, create excessive flashover and corona effects between the more-closely spaced ends of the foils, resulting in damage to the insulation. Bushings having unequal steps and subject to excessive flashover and corona effects are shown on pages 357 and 358 of a work entitled "Theory of Dielectrics" by A. Schwaiger, translated by R. W. Sorensen, John Wiley & Sons, Inc., New York, 1932. In some cases, the diameters of successive foil layers in prior art bushings utilizing continuous foils were adjusted to obtain equal steps at the ends of the foils, but this resulted in the unequal thicknesses of insulation between successive foil layers with resulting disadvantages mentioned above.

As one general object, the present invention seeks to provide current-carrying parts, such as terminal bushings, adapted for carrying electrical current at relatively high voltage and in which the cross-sectional areas of the parts are reduced over prior art devices of this type.

Another object of the invention is to provide a condenser bushing for high voltage applications in which the thicknesses of the layers of insulation between successive concentric foils are substantially the same and the capacity between successive concentric foils are the same, thereby insuring that all layers of insulation between foils are worked at maximum permissible dielectric stress, and the extensions of the layers of foil are graduated in equal steps thereby reducing or eliminating flashover and reducing corona effects.

SUMMARY OF THE INVENTION

In accordance with the invention, a condenser bushing is provided in which alternate layers of conducting foil and insulation are interposed between an outer flange and a conductor extending axially through the flange, and wherein at least some of the foil layers except the outermost layer are discontinuous from end-to-end. The capacitances between successive layers are made equal by adjusting the length of the discontinuity in the foil that exists intermediate its ends. The foils are substantially equally stepped at the outer ends to give the axial grading of dielectric stress preferred with condenser bushings to thereby eliminate excessive flashover and corona effects. As will be understood, this arrangement results in at least two groups of series capacitors connected in parallel between the bushing conductor stud and the outermost layer of foil. At the same time, the thicknesses of the insulating layers between successive foil layers are made equal to facilitate maximum permissible dielectric stress in each insulating layer. This not only results in decreased insulation requirements, but also decreases the overall diameter of the bushing.

The above and other objects and features of the invention will become apparent from the following detailed description taken in connection with the accompanying drawings which form a part of this specification.

BRIEF DESCRIPTION OF THE DRAWINGS

FIGURE 1 is a plurality broken-away elevational view of a condenser bushing constructed in accordance with the principles of the invention and showing in cross-section interleaved conducting foils and insulating paper forming the condenser of the invention;

FIG. 2 is a graph showing the radial voltage distribution in a uniform dielectric between concentric cylinders with and without the series condensers of the invention;

FIG. 3 is an illustration of the approximate electrostatic field at the equally stepped ends of foil layers in the condenser bushing of my invention; and FIG. 4 is a graphical illustration of one type of condenser foil pattern utilized in accordance with the principles of the invention.

DESCRIPTION OF THE PREFERRED EMBODIMENT

Referring now to the drawings, and particularly to FIG. 1, a terminal bushing is indicated generally by the reference numeral 10 and includes a central, axially extending conductor stud 12 having a lower threaded end 8' with an annular porcelain support 14 threaded onto the lower end of a terminal 8'. Above the annular porcelain support 14 is a first insulating porcelain shell 16, a cylindrical casing 18 and an upper cylindrical porcelain shell 20. Above the shell 20 is clamping means, not shown, which, together with the lower porcelain support 14, serves to clamp together the parts 16, 18 and 20. The parts 14, 16, 18 and 20 are separated by suitable gaskets 22, substantially as shown. The cylindrical member 18 is formed of conducting material, such as steel, and is provided with an integral grounded plate or flange 24 to compose the complete bushing flange. Surrounding the conductor stud 12 is a tapered insulating body 26 comprising concentric metallic cylindrical foils separated by layers of insulating material. The outermost one of the foils of the insulating body 26 is grounded along with the flange 24; and in this respect, it will be appreciated that the foils in body 26, hereinafter described in detail, form a condenser between the conductor stud 12 and the ground flange 24.

With reference now to FIGURE 2, the radial voltage distribution in a dielectric between the periphery of the conductor stud 12 and grounded flange 24 is shown. Curve A is that representing the voltage distribution through a uniform dielectric disposed between the conductor stud 12 and flange 24. In other words, it represents the voltage distribution for the case where the body 26 is formed entirely of insulation rather than concentric cylindrical foils separated by insulation. It will be noted that the voltage distribution deviates considerably from a straight line under these circumstances and indicates that the insulation near the conductor stud 12 in the bushing has a greater voltage drop across it than the remainder of the dielectric. The first 10% of the insulation thickness near the stud 12 actually has about 16% of the voltage drop across it, while the last 10% of the insulation near the flange 24 has only 6% of the voltage drop. Thus, if the insulating body 26 should be formed from a uniform dielectric, the dielectric will not be stressed uniformly throughout its radial thickness, resulting in inefficient use of insulation.

When, however, the space between the stud 12 and cylinder 18 is divided by series condensers of equal capacitance, the voltage distribution closely approximates a straight line. Curve B of FIGURE 2 shows the voltage distribution through the same thickness of insulation as the illustration given by curve A, except that equal series condensers have been placed to distribute the voltage.

If a uniform dielectric were used for the tapered insulating body 26, the electrostatic field through the insulation would produce a very high stress concentration at the upper and lower edges of the cylindrical conducting member 18. Such a stress concentration is eliminated by employing the cylindrical concentric foils in the insulating body 26. It is, however, necessary to have substantially equal graduations or steps in the lengths of the foil layers at the ends of the insulating body 26. The reason for this is probably best illustrated in FIGURE 3 which shows an enlarged sectional view of the electrostatic fields at the ends of foil layers of graduated equally stepped lengths. Three such foil layers 28, 30 and 32 are shown, the foil layers being separated by insulation 31 which preferably is kraft paper.

In the manufacture of the insulating body 26, the conducting foils and insulation are wound as concentric cylinders, with the ends forming tapers as at 34 and 36. In order to provide a ground connection for the outermost foil, a circumferential slot or groove about 3/8 inch wide is formed in the outermost layer of insulation to expose the outer foil, and contact to the foil made in this groove provides connection to the grounded flange 24.

In FIGURE 3 it will be noted that the capacitance between foils 28 and 30 is equal to the capacitance between foils 30 and 32, and, the distance $d_1$ between the end of foil 28 and the end of foil 30 is equal to the distance $d_2$ between the ends of foils 30 and 32. This produces substantially equal electrostatic fields 38 and 40 between the end of each foil and its adjacent radially inner foil. Substantially even spacing or steps between the edges or ends of adjacent foils is necessary in order to minimize arcing and/or corona effects. That is, it can be appreciated that if the distance $d_1$ were much less than the distance $d_2$, arcing might occur between the ends of foils 28 and 30 since it must be remembered that the voltage between all foils is the same. It is for this reason that in prior art condenser bushings of this type, the insulation between certain of the inner layers was greater than that at the radially innermost and outermost portions. In other words, since even steps or spacing between the ends of adjacent foils must be achieved as shown in FIG. 3, the provision of equal capacitance of all foils is not simply a matter of adjusting their lengths for a specific radius because, upon consideration, it will be seen that if this were the case, even spacing of the ends could not be achieved with resultant excessive arcing and corona effects.

In accordance with the present invention, however, insulation of equal thickness between all successive layers of foil is achieved by making all but the outermost foil discontinuous as shown in FIGURES 1 and 4. This results in two series capacitors, generally indicated at 42 and 44 in FIGURE 4 between the conductor stud 12 and the grounded flange 24. At the same time, since the layers of conducting foil are discontinuous, the outer ends of each layer can be equally stepped at uniform graduations to prevent excessive arcing and corona effects. In FIGURE 4, it will be appreciated that the composite area of each discontinuous layer may be equal to that of all other layers, thereby resulting in equal voltage steps from the conducting stud 12 to the ground flange 24; and since the layers of insulation between all concentric foils are of the same thickness, the insulation is worked at its maximum permissible stress. This arrangement reduces the cost of the overall bushing and also decreases its diameter.

The outermost layer of foil, shown as continuous in FIG. 4, may be discontinuous, with each section connected to the grounded flange.

The total capacitance between conductor stud 12 and flange 24 provided by the top section of the condenser 44 is not necessarily equal to the total capacitance between conductor stud 12 and flange 24 provided by the bottom section of the condenser 42. Coaxially aligned cylindrical portions of conductive material or foil of the same diameter are referred to herein as sets.

It will be appreciated that while only two parallel condenser arrangements 42 and 44 are shown in FIGURE 4, a larger number may be employed, just as long as the total composite areas of each foil layer is equal to that of the other layers.

Although the invention has been shown in connection with a certain specific embodiment, the drawings and the foregoing written description are illustrative and are not to be interpreted in a limiting sense.

I claim as my invention:

1. A high voltage insulating bushing of the condenser type in which the dielectric is substantially electrically stressed only in a radial direction, comprising an outer casing of conductive material adapted to be mounted in a grounded flange, a centrally located conductor stud adapted to be energized at a high alternating current voltage extending axially through the outer casing, interleaved alternate layers of conductive material and insulating material interposed between the periphery of said conductor stud and the inner periphery of said outer casing, at least some of said layers of conductive material being discontinuous and in two spaced aligned portions forming a set, the two spaced aligned portions of each set being at substantially the same potential with respect to each other, the capacitance between all radially adjacent sets of conductive layers being substantially equal, the overall length of said conductive layers along the axis of the bushing being progressively smaller with the radially outermost layer being of smallest length and the radially innermost layer being of greatest length, said radially outermost layer of conductive material being at ground potential with respect to said conductor stud while the outer casing of the bushing is mounted in the grounded flange the outermost ends of successive conductive layers being stepped at equal intervals to provide substantially equal electrostatic fields between the end of each conductive layer and its inner radially adjacent conductive layer to minimize corona.

2. A high voltage insulating bushing of the condenser type in which the dielectric is substantially electrically stressed only in a radial direction, comprising an outer tubular member of conductive material adapted to be mounted in a ground flange, a centrally located conductor stud adapted to be energized at a high alternating current voltage extending axially through the outer tubular member, interleaved alternate layers of conductive material and insulating material interposed between the periphery of said conductor stud and the inner periphery of said tubular member, at least some of said layers of conductive material being discontinuous in the central portion thereof forming sets of aligned conductive portions, the two spaced aligned portions of each set being at substantially the same potential with respect to each other, the capacitance between all radially adjacent sets of conductive layers being substantially equal and the thickness of the insulating layers between all radially adjacent conductive layers being substantially equal, and means for electrically connecting the radially outermost of said layers of conductive material to the tubular member, the total extension of the sets of the conductive layers decreasing in graduated steps from the conductor stud toward the cylindrical member and flange, all of the steps between radially adjacent layers of conductive material being equal in length at both outermost ends thereof to provide substantially equal electrostatic fields between the end of each conductive layer and its inner radially adjacent conductive layer to minimize corona.

3. A bushing according to claim 1 further characterized in that all of the layers of dielectric material are of equal thickness.

4. A bushing according to claim 1 in which the total capacitance between conductor stud and conductive casing provided by radially adjacent first corresponding portions of the set is not equal to the total capacitance between conductor stud and conductive casing provided by radially adjacent other corresponding portions of the sets.

5. A bushing according to claim 1 in which the the discontinuities in the layers of conductive material are centrally therein.

References Cited
UNITED STATES PATENTS

| | | | |
|---|---|---|---|
| Re. 26,066 | 7/1966 | Huston | 174—143 X |
| 2,981,815 | 4/1961 | Leeds et al. | |
| 952,513 | 3/1910 | Dow | 174—143 |
| 2,386,185 | 10/1945 | Beaver et al. | 174—73 |
| 2,650,334 | 8/1953 | Skeats | 174—143 X |

FOREIGN PATENTS

| | | |
|---|---|---|
| 246,799 | 2/1927 | Great Britain. |
| 345,604 | 3/1931 | Great Britain. |

LARAMIE E. ASKIN, Primary Examiner